US008457669B2

(12) United States Patent
Hardy et al.

(10) Patent No.: US 8,457,669 B2
(45) Date of Patent: *Jun. 4, 2013

(54) SYSTEM AND METHOD FOR ACKNOWLEDGING CALENDAR APPOINTMENTS USING A MOBILE DEVICE

(75) Inventors: Michael Thomas Hardy, Waterloo (CA); Darrell May, Waterloo (CA); Catherine Michelle Coode, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,552

(22) Filed: Feb. 29, 2012

(65) Prior Publication Data

US 2012/0166565 A1 Jun. 28, 2012

Related U.S. Application Data (63) Continuation of application No. 11/829,478, filed on Jul. 27, 2007, now Pat. No. 8,204,521.

(51) Int. Cl.
*H04W 4/00* (2009.01)
(52) U.S. Cl.
USPC ............... 455/466; 455/550.1; 455/412.1; 455/412.2; 455/414.1
(58) Field of Classification Search
USPC ............. 455/466, 412.1, 412.2, 414.1, 418, 455/550.1
See application file for complete search history.

(56) References Cited

U.S. PATENT DOCUMENTS

| 6,167,379 | A | 12/2000 | Dean et al. |
| 6,505,167 | B1 | 1/2003 | Horvitz et al. |
| 2003/0092454 | A1 | 5/2003 | Halim et al. |
| 2004/0243677 | A1 | 12/2004 | Curbow et al. |
| 2006/0068814 | A1 | 3/2006 | Cheng et al. |
| 2007/0079260 | A1 | 4/2007 | Bhogal et al. |
| 2007/0226204 | A1 | 9/2007 | Feldman |

FOREIGN PATENT DOCUMENTS

| EP | 1484703 B1 | 12/2004 |
| EP | 1808802 A1 | 7/2007 |
| JP | 11259568 A | 12/1999 |
| WO | 2007121329 A | 10/2007 |

OTHER PUBLICATIONS

Smith, M. A. et al, "Association for Computing Machinery: Visualization Components for Persistent Conversations" Chi 2001 Conference Proceedings. Conference on Human Factors in Computing Systems. Seattle WA, Mar. 31 to Apr. 5, 2001, New York, NY: IEEE, US.

(Continued)

*Primary Examiner* — Kathy Wang-Hurst
(74) *Attorney, Agent, or Firm* — Jenna L. Wilson; Dimock Stratton LLP (57) ABSTRACT

A system and method are provided for communicating calendar appointment acknowledgements to a sender from a recipient device, in particular a mobile communication device capable of receiving SMS messages. The sender creates a calendar object comprising calendar event data, designates a recipient, and selects a transport method for delivering the calendar event data. If the transport method is SMS, then a calendar object message in plaintext SMS format is prepared, comprising a unique identifier, and transmitted to the recipient. The recipient's mobile communication device receives the SMS message and parses the message to extract the calendar event data, and transmits an acknowledgement to the sender including the unique identifier.

21 Claims, 5 Drawing Sheets

OTHER PUBLICATIONS

Stern, M. K., "Dates and Times in Email Messages", IBM Research, IUI'04, Jan. 13-16, 2004, Madeira, Funchal, Portugal, pp. 328-330.

Nardi, B. A., Miller, J. R., Wright, D. J., "Collaborative, programmable intelligent agents", Mar. 1998, http://www.miramontes.com/writing/add-cacm/, accessed Oct. 12, 2010.

Google Calendar beta Help Center: "How do I create an event via SMS?", http://www.google.com/support/calendar/bin/answer.py?answer=37529, retrieved Jan. 10, 2008.

GCALSYNC: "Synchronize your phone with Google Calendar", http://www.gcalsync.com/, retrieved Jan. 10, 2008.

Google Apps: "Google Calendar", http://www.google.com/a/help/intl/en/users/calendar.html, retrieved Jan. 10, 2008.

Clothier, Julie, "Hospitals Embrace SMS Technology", CNN.com (international) http://edition.cnn.com/2004/TECH/08/12/hospital.texts, Friday, Aug. 13, 2004, 3 pages.

ALPHAOBJECTS GmbH, "Sending SMS directly from Microsoft Outlook", http://www.alphaobjects.ch/test/en/products.htm, 1 page.

MobiMarketing "MobiSMS for Outlook Guide: Creating Reminders", http://www.mobimarketing.com/outlook/reminders.htm, 3 pages.

Nokia Mobile Phones Ltd., "Smart Messaging", Revision 3.0.0, Dec. 18, 2000, 65 pages.

Extended European Search Report dated Apr. 3, 2008 from EP07113370.6.

Examination Report dated Mar. 8, 2010 from CA2638213.

Extended European Search Report dated Apr. 13, 2011 from EP10176387.8.

Examination Report dated Mar. 1, 2012 from CA2638213, 3 pgs.

```
:5B3EA901C:200607011000-8:200607011030-8::foo1@example.com:Phone
Conference
```

FIG. 5a

```
5B3EA901C002006070110000820060701103008000000000000000000000000000000
000foo1@example.com000000000000000000Phone_Conference000000000000000
00000000000000000000
```

FIG. 5b

```
cal-ID: 5B3EA901C   When: 07/01/2006/10:00AM-07/01/2006/10:30AM/PDT
Where:              Org: foo1@example.com    Summary: Phone
Conference
```

```
:5B3EA901C:ACCEPT:200607011000-8:200607011030-8:foo2@example.com:Phone
Conference
```

FIG. 7a

```
5B3EA901C002006070110000820060701103008 0ACCEPT0foo1@example.com0000000
0000000000000Phone_Conference00000000000000000000000000000000000
```

FIG. 7b

```
cal-ID: 5B3EA901C    When: 07/01/2006/10:00AM-07/01/2006/10:30AM/PDT
Status: ACCEPT       Att: foo2@example.com    Summary: Phone
Conference
```

FIG. 7c

SYSTEM AND METHOD FOR ACKNOWLEDGING CALENDAR APPOINTMENTS USING A MOBILE DEVICE

REFERENCE TO PRIOR APPLICATIONS

This application is a continuation of U.S. application Ser. No. 11/829,478, filed Jul. 27, 2007, which is incorporated herein by reference.

TECHNICAL FIELD

This invention relates to mobile devices. In particular, this invention relates to a system and method for communicating calendar appointment acknowledgements to and from a mobile device over a data communication network.

TECHNICAL BACKGROUND

Mobile devices such as digital phones and phone/PDA hybrid devices often support mobile data services and systems such as Short Message Service (SMS) and Global System for Mobile communications (GSM), which allow text messages to be received and sent by mobile devices over data communication networks. SMS is a store-and-forward method of transmitting messages to and from mobile devices. A text-only message from the sending mobile device is stored in a central short message center which then forwards it to the receiving mobile device. If the recipient is not available, the short message is stored and can be sent later. Typically, messages are delivered immediately (or when the mobile device is turned on). SMS also supports return receipts. Thus, the sender, if desired, can get a message notifying if the short message was delivered to the intended recipient.

Calendar applications, which allow users to schedule and coordinate appointments, meetings, and other events which are recorded in a data store, are available for users of personal computers, PDAs, and hybrid phone/PDA devices. Calendar applications are typically capable of providing reminders to the calendar application user in advance of a scheduled appointment, meeting, or event, and may also transmit scheduling information to other users over a network, such as a local area network or the Internet. The format and transport of this information is typically in accordance with Requests for Comments (RFCs) 2445, 2446, and 2447 developed by the Internet Engineering Task Force. These RFCs define the specification and operation of Internet calendaring objects.

While calendar objects are useful for users of calendar applications that are capable of reading them, the utility of calendar objects is limited when other users who may have an interest in scheduled appointments, meetings, or events do not use the same calendar application as that used to create the objects. For example, many calendar applications use proprietary formats for encoding calendar data objects; when they are transmitted to recipient users, the recipient users can only view the objects and automatically store the relevant scheduling data in their respective data stores if they are using the same calendar application. Otherwise, either the recipient user or the sending user must use a conversion application for converting the format of the calendar object from a format compatible with the sending user's calendar application to a format compatible with the recipient user's calendar application. Further, while a recipient user using the same calendar application as the sending user can transmit an "accept" or "decline" acknowledgement to the sending user, which acknowledgement is then automatically recorded in the sending user's data store, a recipient user that is not using the same calendar application as the sending user may not be able to transmit an acknowledgement successfully.

In addition, not every intended recipient of scheduling information utilizes the same message transport that is typically used for sending calendar objects. Calendar objects may be delivered by electronic mail; however, there is a need for users of mobile devices to receive calendar information using other transport mechanisms, such as SMS. Some mobile devices are SMS-enabled, but cannot receive e-mail; other mobile devices that are normally capable of receiving e-mail messages may be temporarily unable to receive e-mail messages because they are outside the range of coverage for their e-mail transport system, yet are still able to receive alternate messages such as SMS messages. While it is known to convert a calendar object to an SMS message for delivery to a mobile device to provide a reminder of a previously scheduled meeting to a recipient using a mobile device, the SMS message simply serves as a text reminder of a meeting that is displayable to the recipient; it cannot be used to actively schedule and confirm the attendance of the SMS recipient, or to update the data store associated with a calendar application on the recipient mobile device.

Thus, it is desirable to provide a system and method for permitting users of mobile devices, in particular SMS-enabled devices, to send, receive, and schedule calendar events over a network comprising heterogeneous mobile devices.

BRIEF DESCRIPTION OF THE DRAWINGS

In drawings which illustrate by way of example only a preferred embodiment of the invention.

DETAILED DESCRIPTION

Figure 1:
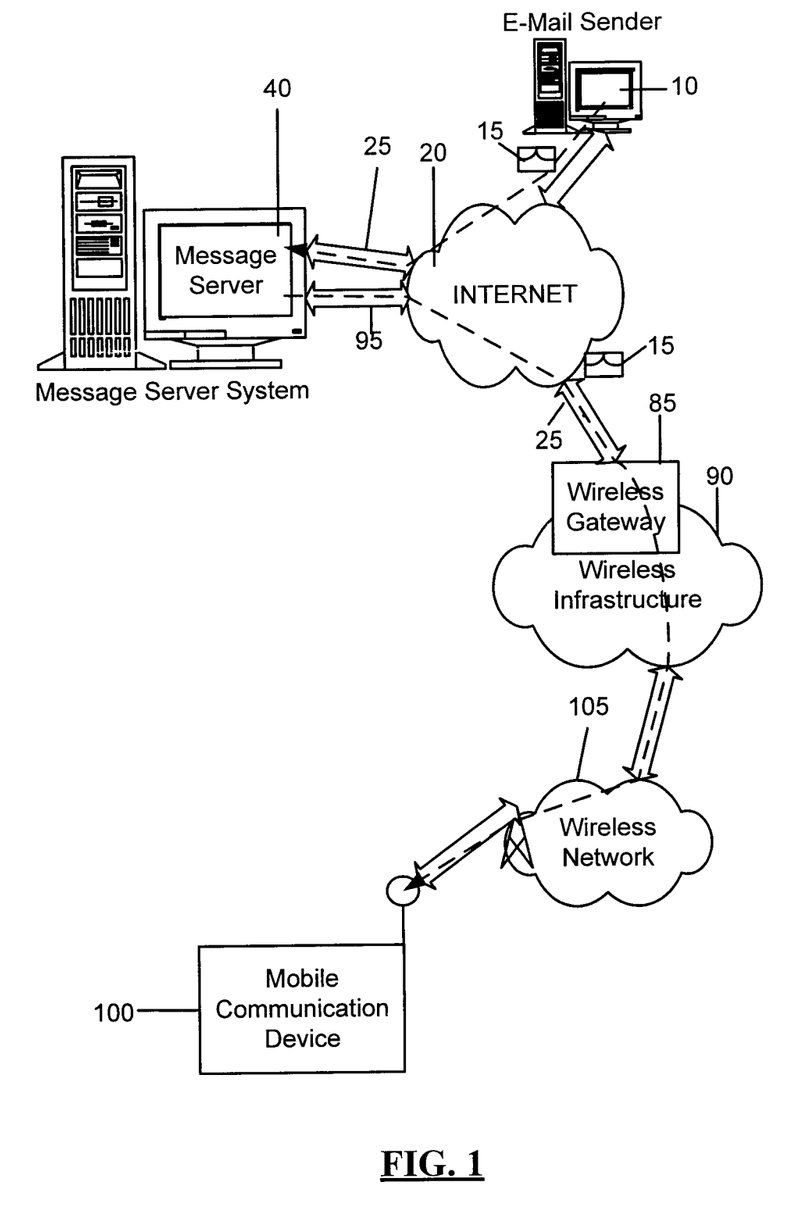
FIG. 1 is an overview of an example communication system in which a wireless communication device may be used.

In the preferred embodiment, a system and method provides for communicating calendar appointment acknowledgements to and from a mobile device over a data communication network. FIG. 1 is an overview of a network comprising an example communication system in which a wireless communication device may be used. One skilled in the art will appreciate that there may be other different topologies, but the system shown in FIG. 1 helps demonstrate the operation of the message processing systems and methods described in the present application. There may also be many message senders and recipients. The simple system shown in FIG. 1 is for illustrative purposes only.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC 2822 (Request for Comment 2822 published by the Internet Society, "Internet Message Format"), headers and Multipurpose Internet Mail Extension (MIME) body parts to define the format of the mail message. These techniques are known to those skilled in the art. The message 15 arrives at the message server 40 and is normally stored in a message store. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric networks include the Mobitex™ Radio Network and the DataTAC™ Radio Network. Examples of older voice-centric data networks include Personal Communication Systems (PCS) networks like GSM, and TDMA systems.

Figure 2:
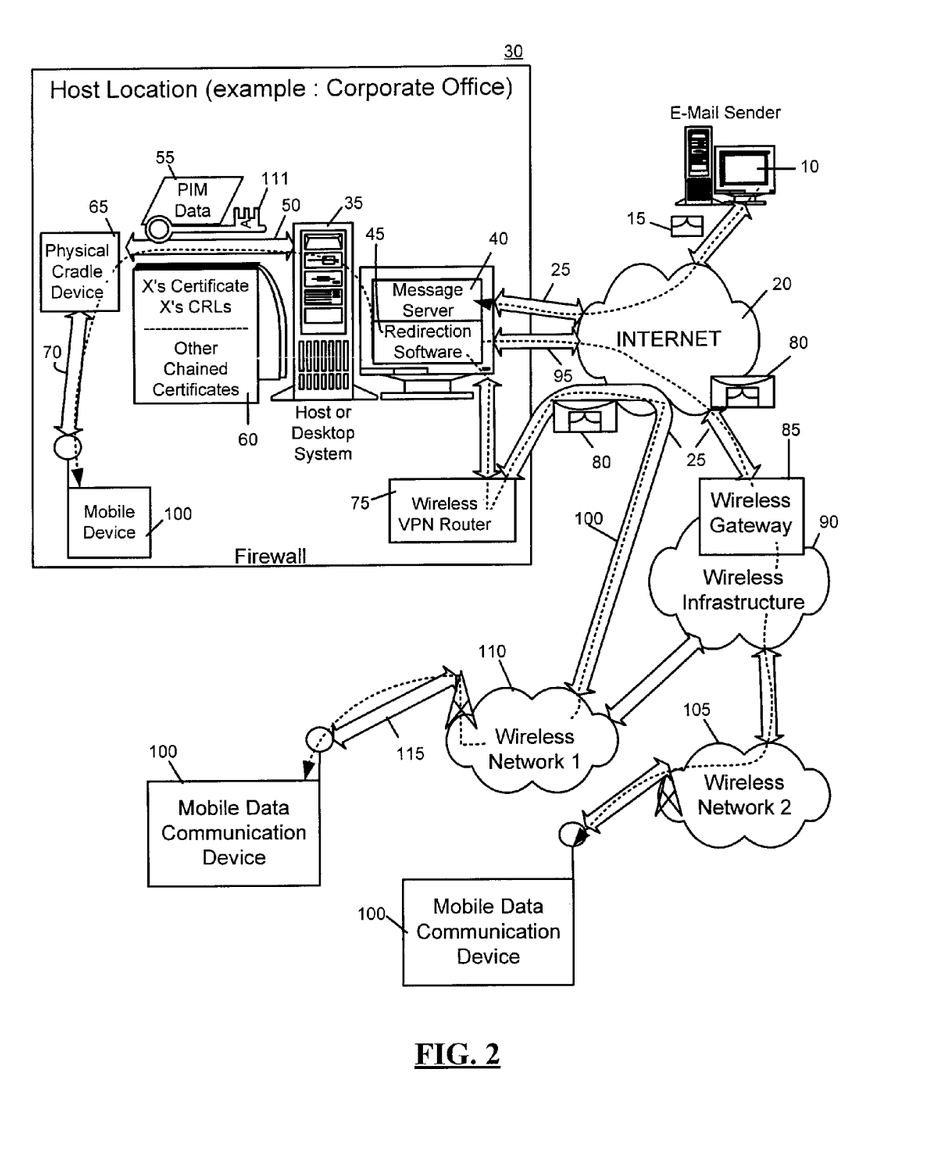
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on a computer within the firewall of the host system that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of one embodiment of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. A VPN connection could be established directly through a specific wireless network 110 to a mobile device 100. The possibility of using a wireless VPN router 75 is contemplated to be used with Internet Protocol (IP) Version 6 (IPV6) on IP-based wireless networks. This protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP (Pretty Good Privacy data encryption) specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
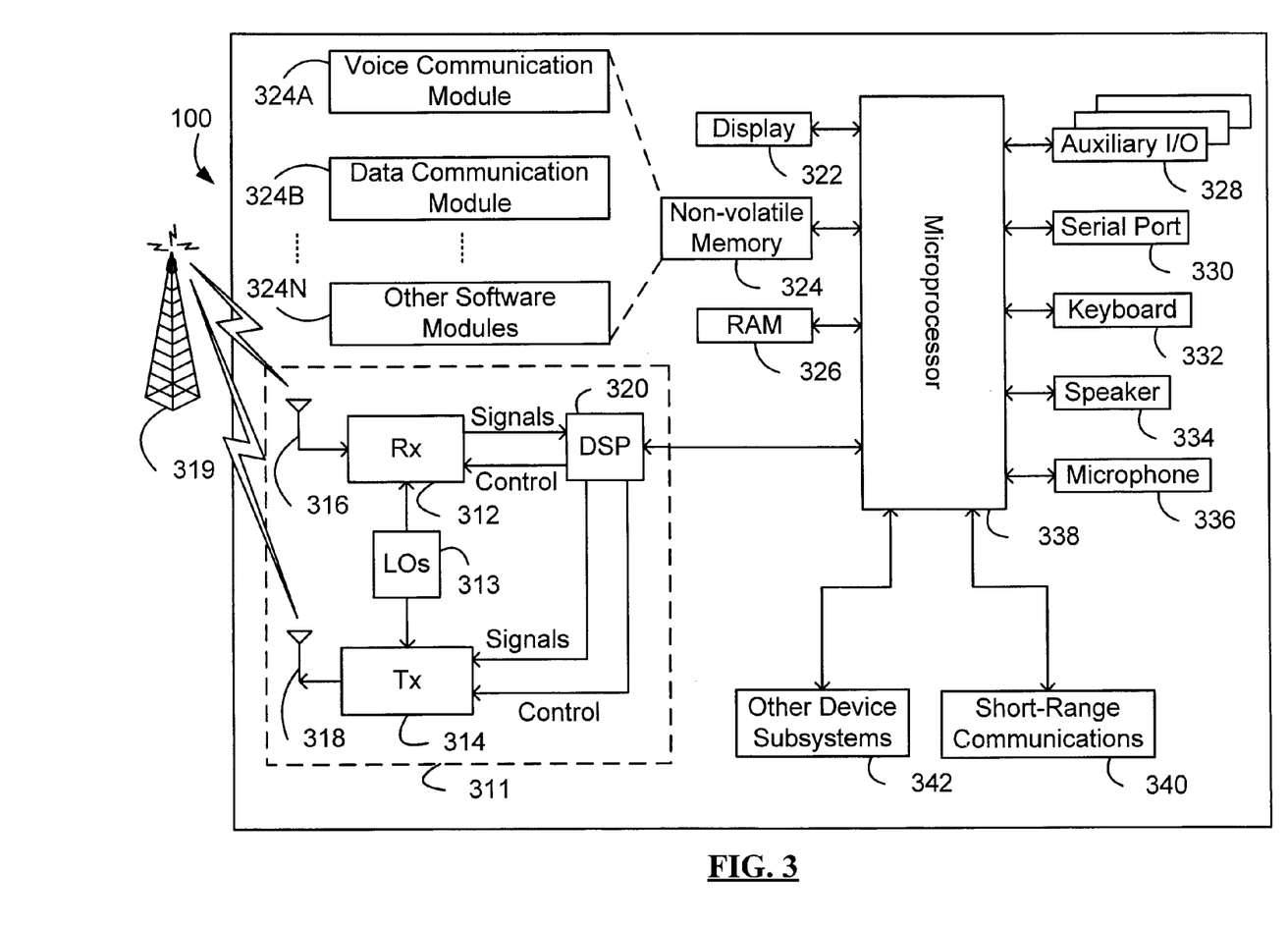
FIG. 3 is a block diagram of a wireless mobile device usable in the example communication system.

As another example, the systems and methods disclosed herein may be used with many different computers and devices, such as a wireless mobile communications device shown in FIG. 3. With reference to FIG. 3, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, an input device, such as a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 3 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319.

The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 3 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

If the systems and methods are implemented with computer program instructions, code adapted to provide the systems and methods described herein may be provided on many different types of computer-readable media including computer storage mechanisms (e.g., CD-ROM, diskette, RAM, flash memory, computer's hard drive, etc.) and signals capable of being received by computing and mobile devices that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

In accordance with a preferred embodiment, a device configured to receive electronic messages, most preferably SMS and e-mail messages, is provided. This device most preferably comprises a mobile communication device 100, but may also include other devices such as a personal computer or other communication device configured to receive such electronic messages. It will be appreciated by those skilled in the art that devices such as personal computers, laptop and other mobile computing devices, PDAs, mobile communication devices such as smart phones and the like, are referred to herein as the "mobile communication device", "communication device", or "mobile device". These mobile communication devices may also have principal functions directed not only data or voice communication over a network, but also to data storage, data processing, or the operation of personal or productivity applications. It will thus be appreciated that the following is not intended to restrict the mobile communication device 100 to the specific examples of communication and computing devices described herein.

Figure 4A:
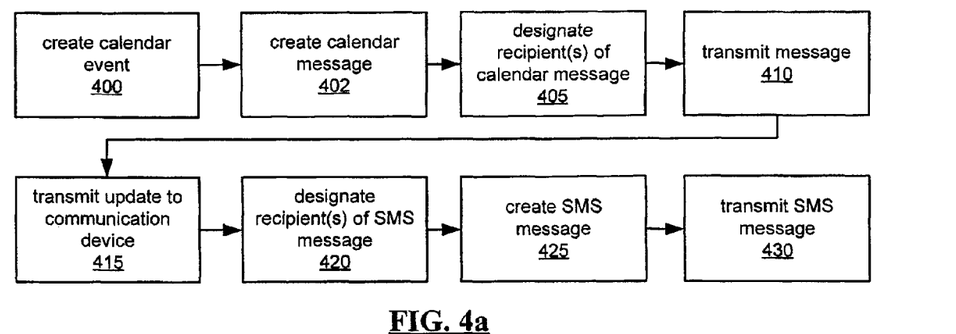
FIGS. 4a and 4b are flowcharts of methods for creating and transmitting a calendar scheduling message to one or more recipients.

Referring to FIG. 4a, at step 402 an initial calendar message intended for at least one recipient is created. Preferably, the calendar message is generated at a server associated with the network depicted in FIG. 1 or 2, for example the message server 40, on behalf of the first user, who for ease of reference will be referred to as the "organizer" of the event that is the subject of the calendar message. The message server 40 may create the calendar message in response to a command received from the organizer's communication device 100. Such a command may be a message transmitted from the organizer's communication device 100 in response to data entered by the organizer at the communication device 100 to create a calendar event at step 400. In this embodiment, the data relating to the calendar event typically comprises information including at least the date and time of the event, and preferably some descriptor or summary describing the event, the attendees of the event as designated by the organizer, and the location of the event and is stored in a memory store such as non-volatile memory 324. The creation of the calendar event at the communication device 100 may be accomplished using a calendar application capable of creating the calendar message comprising at least a portion of this data, for example a software component executable on the communication device and operable by the user to input data relating to the calendar event. The calendar application may be capable of extracting data relating to a calendar event from a message or other file received or stored on the communication device. However, it will be understood that the calendar application need not be a separate or distinct component resident on the device, but may be comprised within, or operate in conjunction with, other applications or functions on the communication device, and further the function of the calendar application may be provided through the execution of software or the operation of hardware components.

Preferably, the organizer designates at least one attendee of the calendar message when the calendar event data is input at the communication device 100 at step 400. The attendee(s) of the message may be designated by the organizer by selecting the attendee(s) from the address book data store, preferably resident on the communication device 100 or on the message server 40, since the calendar application preferably shares access to an address book data store with other applications executed on the organizer's communication device 100. The organizer may alternatively designate the attendee(s) manually, for example by typing in an e-mail address, name, mobile number, or other contact identifier associated with each attendee using the keyboard 332. If the contact identifier entered by the organizer does not comprise a mobile number or e-mail address, or other unique means for identifying the attendee, then the calendar application may query the address book data store for an entry corresponding to the contact identifier in order to locate an appropriate mobile number or e-mail address. The selection or entry by the organizer of an e-mail address rather than a mobile number, or vice versa, may determine the preferred transport method for that attendee; alternatively, the calendar application may determine the preferred transport method for each attendee based on preferred transport method data stored in the address book data store, if the calendar application locates matching attendee data in the address book. If the preferred transport method is determined using this latter method, then the calendar application may alter the data input by the organizer for the calendar event to reflect the preferred transport method.

After the calendar event data has been received by the calendar application and the preferred transport method for each designated attendee has been determined, if necessary, the calendar event data is transmitted from the communication device 100 to the message server 40, encoded in a predetermined manner (either a proprietary format or a standard format such as vCalendar) such that the server 40 processes the encoded data as calendar event data. The message server 40 is provided with a messaging application capable of receiving the calendar event data and creating calendar messages for delivery to designated recipients; however, in the preferred embodiment, the message server 40 may be configured to transmit MIME-encoded messages or messages formatted in the proprietary or standard calendar format mentioned above, and may not be capable of transmitting messages in formats generally utilized in voice-centric wireless networks, such as SMS. Thus, if the calendar event data received from the communication device 100 comprises attendee contact identifiers that require a different message transport than those available to the message server 40, at step 402 the message server 40 will create the calendar message from the provided calendar event data, but at step 405, the message server 40 will designate as recipients only those attendees who are capable of receiving the calendar message in the predetermined calendar format, for example only those recipients with contact identifiers that are registered as users of the network served by the message server 40. It will be appreciated that step 405 may precede step 402 at the message server 40.

The predetermined format calendar message may comprise a number of field-value pairs, including basic information such as location, start time, end time, duration, date, organizer, and summary, as well as other information including status (i.e., whether accepted or declined), recipients, delegates, time zone, whether reminders have been set, and recurrence.

The calendar message further comprises a calendar event identifier associated with the calendar event, which in the preferred embodiment will be referred to as the "cal-ID". The cal-ID may comprise a string of alphanumeric characters of predetermined length or comprising a predetermined string of characters, or both. Preferably, the cal-ID is unique to the calendar event at the message server 40; at the least, preferably the cal-ID is unique to the calendar event organizer. For example, the cal-ID may comprise a datestamp corresponding to the scheduled start time of the calendar event, plus a network identifier identifying the event organizer The cal-ID may alternatively comprise a network identifier for the event organizer, plus a nonce or other identifier value such that the cal-ID may be used at the message server 40 or at the communication device 100 to identify the calendar event. In the most preferred embodiment, the cal-ID comprises a network identifier for the organizer, a nonce or other value that is unique to the calendar event at the communication device 100, and a further code that may be used to identify the string of characters as a cal-ID.

The cal-ID may be generated at the message server 40 when the calendar message is generated (i.e., during or at approximately the same time as step 402), although preferably it is generated at the time the calendar event is created at the communication device 100. If the cal-ID is generated at the communication device 100 at or around step 400, then the calendar event data encoded and transmitted from the communication device 100 to the message server 40 will also comprise the cal-ID value. The cal-ID thus generated at the communication device 100 is also stored in association with the calendar event data stored at the device 100 at step 400.

The message server 40 then transmits the calendar messages to the designated recipient(s) at step 410, and then transmits an update message to the organizer's communication device 100 at step 415. The update message provides confirmation to the calendar application on the device 100 that the calendar messages have been transmitted to the recipients of the predetermined calendar format messages and comprises at least a subset of the calendar event data, such as the cal-ID, and the identifiers of the recipients to whom the calendar message had been transmitted. The format of the update message may be in a predetermined, proprietary calendar data format, or in a standard format used for transmitting calendar event data. Thus, when the communication device 100 receives the update message, the update message is passed to the calendar application, and if the cal-ID has previously been generated at the communication device 100 and stored in association with the calendar event, the calendar application can correlate the confirmation information with the calendar event previously stored using the cal-ID. If the cal-ID had been generated at the message server 40, then the calendar application may correlate the confirmation information and the cal-ID with the calendar event previously stored at the communication device by querying the data store for calendar event data corresponding to that received in the update message. Preferably, steps 415 and 410 occur at approximately the same time, so that the organizer's communication device 100 receives the update message from the message server 40 before responses are received from the designated recipient(s) of the messages sent at step 410; in this embodiment, however, responses from the designated recipients of the message sent at step 410 will be received by the message server 40 before they are received by the organizer's communication device 100, and preferably all messages received for the organizer's communication device 100 are routed to the organizer's device 100 in the order in which they are received; therefore, the organizer's device 100 will not receive any responses from the designated recipients until the update message of step 415 has been received and processed, and the calendar application on the organizer's device 100 will not create and transmit SMS calendar messages to the designated SMS recipients at steps 420 and 425 until the update communication is received from the message server 40.

The calendar application or other component at the communication device 100, having received the update message, then determines at step 420 whether any of the designated attendees from step 400 have yet to be sent a calendar message. In the exemplary embodiment described above, the message server 40 did not transmit calendar messages to those attendees identified by mobile number. Therefore, at step 425, the calendar application, or other component of the calendar system, constructs an SMS message in accordance with existing SMS specifications, for example with a 160 character limit. Although it is possible to concatenate a plurality of SMS messages for delivery to an SMS recipient, it is preferable, wherever possible, to provide all relevant information in a single SMS message. Given the size restrictions of an SMS message, preferably the calendar application constructs an SMS message comprising only the most relevant types of the calendar scheduling data, namely the date, start time, duration or end time, location, and if possible, a brief summary or title. As an example, an SMS message may be constructed with the following plaintext content:

cal-ID: 5B3EA901C
When: 7/1/2006 10:00 AM PDT—7/1/2006 10:30 AM PDT
Where:
Organizer: foo1@example.com
Summary: Phone Conference It will be appreciated that other types of data, and other headings and delimiters, may be included. The descriptors or delimiters such as "When:", "Where:", "Organizer:", and "Summary:" the format of the date and time, and the number of characters allocated to each field, may be adjusted or truncated as necessary to fit within the 160-character limit. The cal-ID value illustrated above is merely an example of a possible cal-ID value; the cal-ID value is preferably in the format of the preferred embodiment described earlier.

Figure 5A:
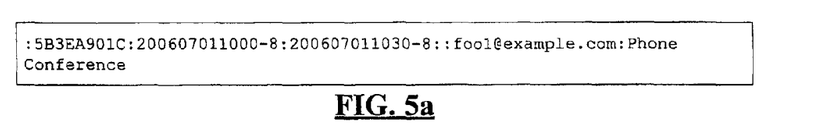
FIGS. 5a, 5b, and 5c are exemplary calendar scheduling messages formatted for SMS delivery.
Figure 5B:
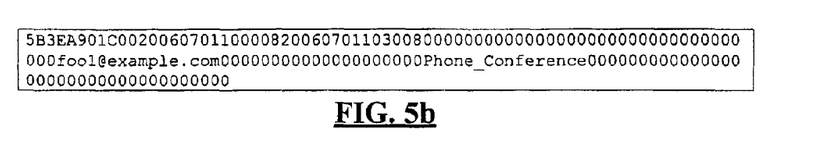
Figure 5C:
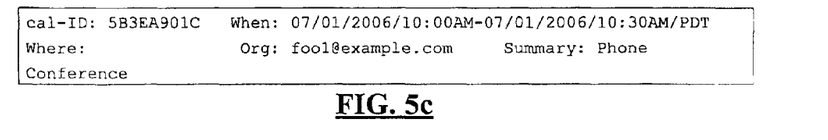

The format of the SMS message may comprise a predetermined order for the descriptors or delimiters; thus, the delimiters may be further truncated in order to further reduce the message size. For example, the SMS message may be constructed as depicted in FIG. 5a, in which the values are unlabelled, but are delimited by a colon (:); the date and time is rendered in a universal format, and the lack of a value corresponding to the location ("Where:") is denoted by two delimiters in a row. In an alternative embodiment shown in FIG. 5b, the SMS message is constructed without the use of descriptors or delimiters, but such that each value is represented by a string of predetermined length (for example, strings shorter than the predetermined length may be padded with null characters). As will be appreciated in the following description, while an SMS message in this condensed format may be processed by a communication device 100, it may be preferable to provide an SMS format with more explicit descriptors such as those shown in FIG. 5c in the event that the SMS message is received on a recipient device that is not capable of processing the received SMS message as a calendar event. The SMS message is then transmitted from the communication device 100 at step 430 to the designated SMS recipients via the SMS transport, using the recipient mobile numbers.

Figure 4B:
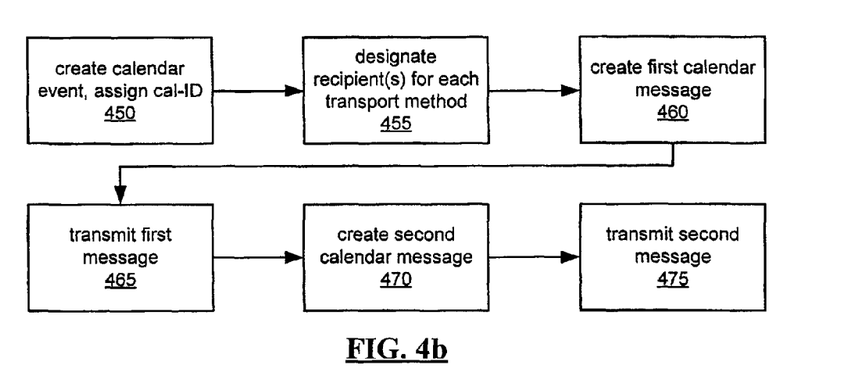

In an alternative embodiment, the calendar messages may be transmitted from the organizer's communication device 100, rather than from the message server 40. In that case, the calendar application at the communication device 100 will carry out some of the steps that were carried out by the server 40 in the preferred embodiment. Referring to FIG. 4b, the calendar event is created at the organizer's communication device 100 at step 450, in a manner similar to step 400; however, preferably the cal-ID is generated at step 450 as well, either at the time the event data is stored at the mobile device 100 or at the time the organizer invokes the calendar application to input the event data. At the time the calendar event is created, the organizer will also designate attendees in a manner similar to that described above. However, at step 455, the calendar application, or a component thereof, at the communication device 100 designates the recipient(s) of standard format calendar messages and the recipient(s) of SMS format messages, according to the preferred transport method identified for each attendee. The calendar application then creates the first format calendar message (e.g., the message to be formatted in a proprietary or standard calendar format) at step 460 and transmits it to the designated recipient(s) at step 465, and then creates the second format calendar message (e.g., the SMS format message) at step 470 and transmits it to the designated SMS recipient(s) at step 475. It will be appreciated that in all these embodiments, the transmission function at the communication device 100 need not be carried out specifically by the calendar application or a calendar component; the calendar application may pass either type of encoded calendar message to the appropriate transport layer on the communication device 100 for transmission according to the selected transport.

Thus, the calendar application at the communication device 100 bypasses the messaging function of the message server 40 in respect of composing calendar messages; the message server 40 in this embodiment merely receives the messages comprising encoded calendar data from the communication device 100, and routes the messages to the recipients to whom the messages are addressed. The message server 40 in that case does not provide an update message to the communication device 100. However, the calendar data stores at the communication device 100 and the message server 40 may be synchronized at a later time, such that the message server 40 will also maintain the same calendar event data at a store on the network.

Figure 6A:
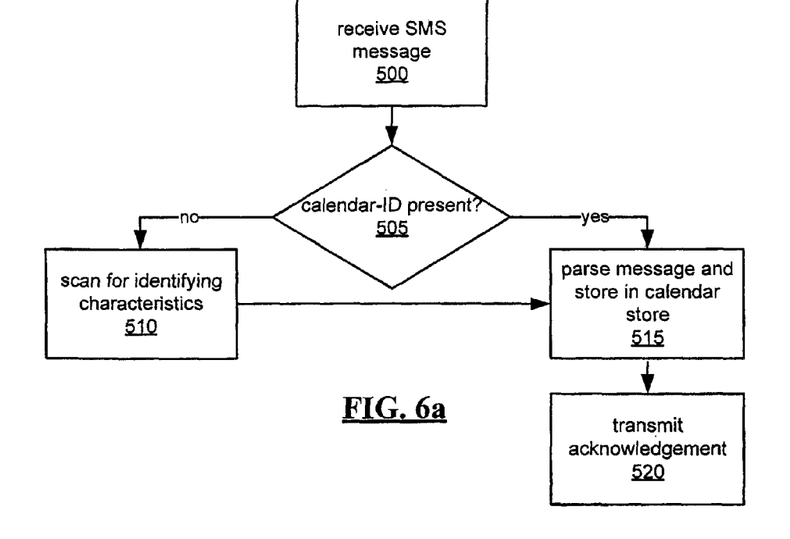
FIG. 6a is a flowchart of a method for receiving and acknowledging a calendar scheduling message on a device provided with a calendar application capable of being interfaced with a messaging client.

At the recipient side, calendar messages in the proprietary or standard calendar message format, described above, may be handled by the calendar application resident on the recipient's communication device 100, since the message server 40 or organizer's communication device 100 would have transmitted the message in that format on the assumption that the recipient's device 100 was capable of processing calendar event data thus encoded. When the calendar message is received as an SMS message by a recipient's communication device 100, the SMS message is processed differently depending on whether a calendar application is available on the recipient's communication device 100. As shown in FIG. 6a, with reference to a recipient communication device 100 provided with a calendar application, or other component of the calendar system that has registered with the operating system of the communication device 100 or with the SMS message transport module to receive notifications about incoming SMS messages and is capable of processing the received SMS message, the message is received at step 500. The message is then automatically scanned at step 505 for an identifier designating the SMS message as a calendar data message; preferably, the content of the SMS message comprises an identifier such as the cal-ID identifier described above. Thus, the cal-ID identifier functions as a flag in the message to indicate to the receiving device that the message comprises calendar data for further processing. If the identifier is located, then the calendar application recognizes the SMS message as a calendar data message, parses the message content, and stores the calendar data in the calendar store at step 515, optionally displaying the calendar event to the user of the communication device 100 in the same manner used for other calendar events created using the calendar application. This step of storing the data may include querying the recipient as to whether the recipient wishes to accept or decline the calendar event, that is, to store the calendar entry in the recipient's communication device's calendar data store or not. If the recipient chooses to store the calendar entry, preferably the calendar application automatically transmits an "accept" response to the sender of the calendar message at step 520 described in more detail below. If the recipient chooses not to store the calendar entry, then preferably the calendar application automatically transmits a "decline" response to the sender at step 520.

In the foregoing preferred embodiment, the calendar application, having registered for receiving notifications regarding incoming SMS messages, receives the content of each SMS message received from the SMS transport module resident on the communication device 100 and carries out the step 505. In a further embodiment, the SMS transport module is configured to carry out the step of scanning for the cal-ID identifier at step 505; for the SMS transport module to recognize the cal-ID identifier, the identifier must comprise a predetermined format or content (e.g. a predetermined character string), and the SMS transport module must be configured to identify the predetermined format or string. In this further embodiment, the SMS transport module locates the cal-ID identifier, and if located the SMS transport module passes the content of the SMS message to the calendar application for further processing as described above. Those skilled in the art will appreciate that the same methodology may be carried out with respect to e-mail or other format messages and a corresponding transport module on the recipient's communication device 100.

Figure 7A:
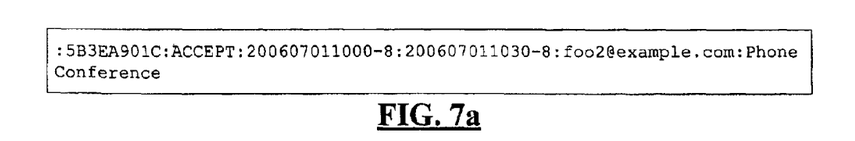
FIGS. 7a, 7b, and 7c are exemplary acknowledgement messages formatted for SMS delivery.
Figure 7B:
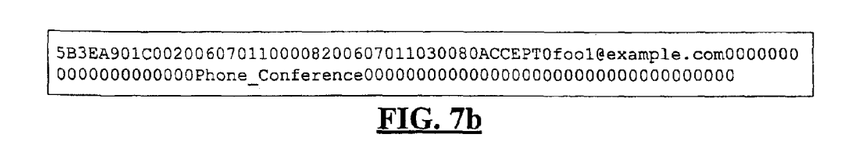
Figure 7C:
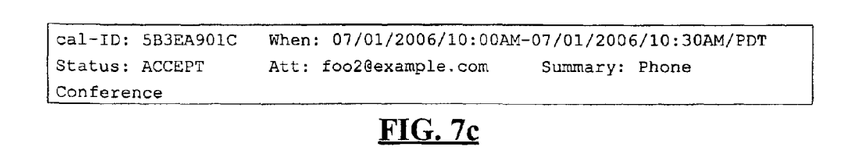

The "accept" or "decline" response to the received SMS calendar message may be created and transmitted at step 520 in a format known in the art using an e-mail message comprising the accept or decline response as an attachment in a format readable by the first user's calendar application. In the preferred embodiment, the calendar application on the recipient's communication device is capable of preparing a response that for transmission as an SMS message. The calendar application may automatically create a text message for delivery using the SMS transport, which identifies the calendar message by identifier, and further comprises an ACCEPT or DECLINE value. Thus, a simple embodiment of the response to be sent via SMS may comprise the following:

Summary: Phone Conference
Status: ACCEPT
Attendee: foo2@example.com
cal- ID: 5B3EA901C Some examples of SMS responses are shown in FIGS. 7a, 7b, and 7c; in these responses, the "status:" field is used in place of the location field "Where:" of FIGS. 5a, 5b, and 5c. The calendar application, or other component on the organizer's communication device 100 is likewise configured to register for receiving notifications about incoming SMS messages and is configured to parse this response message once received in a manner similar to the calendar application on the recipient device; that is, the organizer's communication device 100 is configured to scan the SMS message, either using the SMS transport module or the calendar application, to locate the identifier cal-ID or its value, and to thus identify the message as a calendar data message. The calendar application then utilizes the cal-ID identifier value to query its associated data store for the identifier, and if a match is found, update the status of the calendar event (in this case, to note that an attendee had accepted the scheduled event).

If the original calendar message had been created at the message server 40, then after the recipient's response transmitted at step 520 is received at the organizer's communication device 100, the calendar application or other component on the organizer's communication device 100 may create an update message for transmission to the message server 40 in order to update the calendar event data stored by the message server 40. This update message may be in a standard or proprietary format capable of being processed by the message server 40 for updating the calendar event.

Figure 6B:
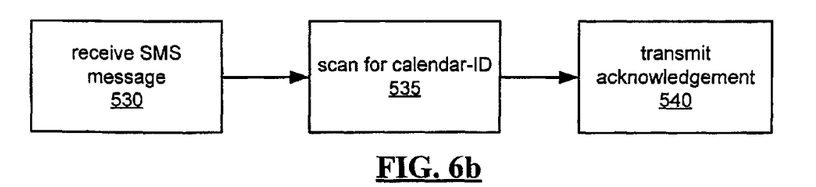
FIG. 6b is a flowchart of a method for receiving and acknowledging a calendar scheduling message on a device that is not provided with a calendar application capable of being interfaced with a messaging client.

It will be appreciated that if the communication device 100 receiving a calendar message as described above is not provided with software to process the received calendar SMS message as described above, the content of the SMS message is still displayable to the user as a regular SMS message. Thus, in the preferred embodiment, the SMS message is formatted in a manner that is human-readable; for example, in formats analogous to those shown in FIGS. 5c and 7c. Preferably, however, even if the recipient's communication device cannot process the received calendar SMS message and store the calendar data in a calendar data store, the recipient's communication device is configured to transmit an acknowledgement comprising an ACCEPT or DECLINE response comprising the identifier, as described above. In that case, the receipt of the message would follow the steps shown in FIG. 6b, including receipt of the SMS message 530; scanning for the identifier to determine whether the message requires an ACCEPT or DECLINE response 535; and transmitting an acknowledgement comprising the identifier 540. For example, the SMS transport layer at the recipient's communication device 100 may be configured to identify the cal-ID identifier at step 535, and to generate and transmit a responding SMS message comprising the cal-ID identifier at step 540.

Returning to FIG. 6a, in a further embodiment a user with a communication device 100 registered with the network comprising the message server 40 implementing the calendar functions described above may receive an SMS calendar message from a user (an "external organizer") that is not associated with the message server 40, using a communication device 100 that is not configured to implement a message identifier such as the cal-ID identifier. In that case, the SMS message may be formatted in a manner similar to those formats described in FIGS. 5a, 5b, and 5c; however, the SMS message will lack the cal-ID identifier. If the identifier is not found at step 505, then the received SMS message will be treated by the recipient's communication device 100 as a normal SMS message, and will be displayed to the recipient accordingly. In that circumstance, preferably the application displaying the SMS message is configured to provide the recipient with the option of designating the received message as a calendar data message, for example by providing a selectable menu option in a user interface, causing the content of the message to be passed to the calendar application and then scanned at step 510 for identifying characteristics such as the text "When:", "Where:", "Organizer:", and/or "Summary:" to confirm that the message does indeed contain calendar data. The calendar application then parses the message and stores the data at step 515, and then an acknowledgement message is transmitted at step 520, as described above. The identifying characteristics that are used to confirm the calendar data content of the message and to parse the message may be set by default by the manufacturer of the communication device or the calendar application, or may be defined by the user or a system administrator.

Preferably, at step 515, the calendar application also generates and assigns a cal-ID identifier to the calendar data and stores this cal-ID identifier with the other calendar data. If the calendar application is configured to synchronize the calendar data store on the communication device 100 with data stored on the network, for example at the message server 40, then the calendar application also generates and transmits the calendar event data, and the cal-ID value, to the message server 40. Preferably, the cal-ID identifier is unique to the event and the external organizer, so far as the data stores at the recipient's communication device 100 and the message server 40 are concerned. Thus, if the recipient later wishes to alter or review the event data, the event is locatable either in the data store at the communication device 100 or the data store on the network, and the event is further associated with a unique cal-ID identifier.

Various embodiments of the present invention having been thus described in detail by way of example, it will be apparent to those skilled in the art that variations and modifications may be made without departing from the invention.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method, comprising:
   receiving, by a communication device, an SMS message comprising first calendar event data for a first calendar event, the first calendar event data comprising at least one of:
      a predefined heading and a value associated with the predefined heading; and
      a predefined delimiter to delimit values associated with a predefined set of calendar event data types, wherein each value being delimited is represented by a character string of predefined length;
   the communication device scanning the received SMS message for a first unique calendar event identifier;
   if the first unique calendar event identifier is found, the communication device:
      generating a responding SMS message comprising the first unique calendar event identifier and either an accept response or a decline response depending on whether or not the first calendar event is stored at the communication device; and
      transmitting the responding SMS message to an organizer of the first calendar event.

2. The method of claim 1, further comprising the communication device transmitting the first calendar event data and the first unique calendar event identifier for storage in a network data store associated with the communication device.

3. The method of claim 1, wherein the responding SMS message is addressed to a sending device associated with the organizer.

4. The method of claim 1, further comprising the communication device storing the first calendar event data from the received SMS message in a calendar data store at the communication device.

5. The method of claim 1, wherein if the first unique calendar event identifier is not found, the communication device:
   generating a unique calendar event identifier and storing the first calendar event data from the received SMS message in association with the unique calendar event identifier thus generated;
   generating a responding SMS message comprising either an accept response or a decline response; and
   transmitting the responding SMS message to an organizer of the first calendar event.

6. The method of claim 5, wherein the first calendar event data and the unique calendar event identifier thus generated are stored at the communication device.

7. The method of claim 5, wherein the first calendar event data and the unique calendar event identifier thus generated are stored at a network data store associated with the communication device.

8. The method of claim 1, further comprising:
   the communication device obtaining second calendar event data from input at the communication device;
   generating a second unique calendar event identifier associated with the second calendar event data;
   generating a calendar message comprising the second calendar event data and the second unique calendar event identifier;
   selecting a transport method for a recipient of the calendar message;
   addressing the calendar message to the recipient; and
   transmitting the calendar message according to the selected transport method.

9. The method of claim 8, wherein selecting the transport method for the recipient of the calendar message comprises determining a preferred transport method for the recipient.

10. The method of claim 8, wherein the transport method is SMS.

11. A communication device configured to receive and transmit SMS messages, the communication device comprising:
   a memory comprising a calendar data store for storing calendar event data; and
   a processor configured to:
      enable receipt of an SMS message comprising first calendar event data for a first calendar event, the first calendar event data comprising at least one of:
         a predefined heading and a value associated with the predefined heading; and
         a predefined delimiter to delimit values associated with a predefined set of calendar event data types, wherein each value being delimited is represented by a character string of predefined length;
      scan the SMS message which was received for a first unique calendar event identifier; and
      if the first unique calendar event identifier is found,
         generate a responding SMS message comprising the first unique calendar event identifier and either an accept response or a decline response depending on whether or not the first calendar event is stored at the communication device; and
         initiate transmission of the responding SMS message to an organizer of the first calendar event.

12. The communication device of claim 11, wherein the communication device is configured to transmit the first calendar event data and the first unique calendar event identifier for storage in a network data store associated with the communication device.

13. The communication device of claim 11, wherein the processor is configured to address the responding SMS message to a sending device associated with the sender.

14. The communication device of claim 11, wherein the communication device is configured to store the first calendar event data from the received SMS message in the calendar data store.

15. The communication device of claim 11, wherein the processor is further configured to, if the first unique calendar event identifier is not found:

generate a unique calendar event identifier and store the first calendar event data from the received SMS message in association with the unique calendar event identifier thus generated;

generate a responding SMS message comprising either an accept response or a decline response; and transmit the responding SMS message to a sender of the received SMS message.

16. The communication device of claim 15, wherein the first calendar event data and the unique calendar event identifier thus generated are stored in the calendar data store.

17. The communication device of claim 15, wherein the communication device is configured to transmit the first calendar event data and the first unique calendar event identifier thus generated for storage at a network data store associated with the communication device.

18. The communication device of claim 11, wherein the processor is further configured to:

obtain second calendar event data from input at the communication device;

generate a second unique calendar event identifier associated with the second calendar event data;

generate a calendar message comprising the second calendar event data and the second unique calendar event identifier;

select a transport method for a recipient of the calendar message;

address the calendar message to the recipient; and transmit the calendar message according to the selected transport method.

19. The communication device of claim 18, wherein the communication device is configured to select the transport method for the recipient of the calendar message by determining a preferred transport method for the recipient.

20. The communication device of claim 18, wherein the transport method is SMS.

21. A communication device configured to receive and transmit SMS messages, the communication device comprising:

a memory comprising a calendar data store for storing calendar event data;

a processor configured to:

select a preferred transport method for a selected recipient of a calendar message;

if the selected transport for the recipient is SMS, format the calendar message as an SMS message;

generate the calendar message comprising calendar event data and a unique calendar event identifier, the calendar event data comprising at least one of:

a predefined heading and a value associated with the predefined heading; and a predefined delimiter to delimit values associated with a predefined set of calendar event data types, wherein each value being delimited is represented by a characters string of predefined length;

initiate transmission of the SMS message to the recipient, the communication device being further configured to receive a responding SMS message from the recipient, the responding SMS message comprising the unique calendar event identifier and either an accept response or a decline response depending on whether or not the calendar event is stored by the recipient, and to store the accept response or the decline response in the calendar data store.

\* \* \* \* \*

UNITED STATES PATENT AND TRADEMARK OFFICE
CERTIFICATE OF CORRECTION

| | | |
|---|---|---|
| PATENT NO. | : 8,457,669 B2 | Page 1 of 1 |
| APPLICATION NO. | : 13/408552 | |
| DATED | : June 4, 2013 | |
| INVENTOR(S) | : Michael Thomas Hardy, Darrell May and Catherine Michelle Coode | |

It is certified that error appears in the above-identified patent and that said Letters Patent is hereby corrected as shown below:

In the Claims:

Col. 20, line 29, claim 21, after "predefined length;" insert --and--.

Signed and Sealed this
Twenty-third Day of July, 2013

Teresa Stanek Rea
*Acting Director of the United States Patent and Trademark Office*